United States Patent Office 3,538,032
Patented Nov. 3, 1970

3,538,032
WAX-AMINE CONTAINING TERPOLYMER COMPOSITIONS FOR ALUMINUM COATING
Thomas V. Liston, Kentfield, Calif., assignor to Chevron Research Company, San Francisco, Calif., a corporation of Delaware
No Drawing. Filed June 21, 1967, Ser. No. 647,610
Int. Cl. C08f 45/52
U.S. Cl. 260—28.5                                    5 Claims

---

ABSTRACT OF THE DISCLOSURE

Wax compositions for coating aluminum having a substantial portion of a terpolymer having at least about 55 mole percent ethylene, and the remainder being a 1-olefin of from 3 to 6 carbon atoms and an olefin of at least 5 carbon atoms having at least 1 amine nitrogen substituent, wherein the polymer has at least 0.05 weight percent amine nitrogen.

---

BACKGROUND OF THE INVENTION

Field of the invention

In packaging, composite films are prepared much like plywood having 2 or more plies of diverse materials. For example, composite films may be prepared from aluminum and glassine paper or corrugated board, etc. Since aluminum only poorly adheres to other materials, such as paper, glassine paper, metals, etc., the aluminum is coated with a thin film of an adhering material to provide the necessary adhesion. Wax compositions have been used for this purpose, wherein a component is provided in the wax to provide the necessary adhesion of the wax to the aluminum as well as the other material.

Also, wax coatings on aluminum are used for protection of the aluminum from attack by acidic reagents.

Description of the prior art

The most commonly used materials used for providing adhesion to wax compositions are ethylene-vinyl acetate copolymers. These polymers may be used as a polyester or partially hydrolyzed to the polyvinyl alcohol. Another polymer which finds use is ethylene-maleic anhydride copolymer.

Wax compositions having hydrocarbon substituted alkylene polyamines have been used for finishing and softening cellulosic fibers and textile fabrics. See U.S. Pat. No. 2,695,243.

SUMMARY OF THE INVENTION

Wax compositions are provided having from 10 to 40 weight percent of a terpolymer of ethylene (at least 55 mole percent), a 1-olefin of from 3 to 6 carbon atoms and a 1-olefin of at least 5 carbon atoms having at least one amine nitrogen group at least $\beta$ (2 carbon atoms) from the olefinic group. The polymer has a molecular weight in the range of about 20,000 to 160,000 and has from about 0.05 to 4 weight percent amine nitrogen.

DESCRIPTION OF THE PREFERRED EMBODIMENTS

The wax compositions of this invention will generally have from about 60 to 90 weight percent of wax and about 10 to 40 weight percent of the terpolymer, more usually from about 70 to 80 weight percent of wax and from about 20 to 30 weight percent of the terpolymer. Usually, from about 1 to 5 weight percent based on the total composition of other additives may also be included in the wax composition. These additives include low density polyethylene, modified rosin esters, polyterpene resins, etc.

The waxes which find use will generally be paraffin, semi-microcrystalline or microcrystalline waxes having AMP melting points (ASTM melting point) in the range of about 120 to 200, more usually in the range of about 145 to 185. The waxes will generally be deoiled waxes, having less than about 10 weight percent of oil.

The terpolymer which finds use has at least 55 mole percent of ethylene, at least 40 mole percent of a 1-olefin of from 3 to 6 carbon atoms having only 1 alkyl group pendant from the olefin and a 1-olefin, which has at least 5 carbon atoms having at least 1 amino nitrogen containing group at least 2 carbon atoms removed from an olefinic carbon atom, present in an amount sufficient to provide the necessary nitrogen content of the polymer at least 0.05 weight percent For the most part, the terpolymers used in the wax composition will have the following formula:

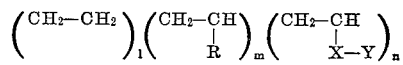

wherein R is lower alkyl of from 1 to 4 carbon atoms, preferably of from 1 to 3 carbon atoms and particularly preferred wherein R is methyl, X is an alkylene group of at least 2 carbon atoms, usually of from 2 to 10 carbon atoms, and more usually of from 2 to 6 carbon atoms and Y is a basic nitrogen containing radical, generally of from 0 to 16 carbon atoms, more usually of from 2 to 12 carbon atoms. Y may have up to 6 basic nitrogen atoms, but will generally have from about 1 to 5 amino groups. The amine nitrogens may be primary, secondary or tertiary amines.

$l$, $m$ and $n$ are the average number percent of the individual monomers in the polymer composition, adding up to 100 percent. $n$ will generally be in the range of about 0.1 to 5 percent, more usually in the range of about 0.5 to 3 percent. $l$ will be in the range of about 55 to 90 percent, more usually in the range of about 60 to 85 percent. $m$ will generally be in the range of about 10 to 40 percent, more usually in the range of about 15 to 35 percent.

The hydrocarbon olefins of from 3 to 6 carbon atoms are illustrated by propylene, butene-1, pentene-1, 3-methylbutene-1, and 4-methylpentene-1, preferably propylene.

The basic nitrogen containing olefin has the formula:

$$CH_2=CH$$
$$\phantom{CH_2=}|$$
$$\phantom{CH_2=}X-Y$$

wherein X is an alkylene group of from 2 to 10 carbon atoms, more usually of from 2 to 6 carbon atoms and Y is a basic nitrogen containing radical bonded through amine nitrogen to X, Y having from 0 to 16 carbon atoms, more usually from 2 to 12 carbon atoms, and preferably from 2 to 6 carbon atoms, has from 1 to 6 amine nitrogen atoms, more usually from 1 to 5 amine nitrogen atoms, and preferably from about 1 to 3 amine nitrogen atoms. The carbon atoms will generally be aliphatic carbon atoms, usually free of aliphatic unsaturation, although one site of unsaturation may be present. Essential to the invention is that there be at least 1 amine nitrogen to provide a polar group for bonding to the aluminum surface.

The Y group may be broken down into 3 different groups of amine functionalities: amino, alkylene polyamine, and imidazoline.

The amino functionality will be considered first. As the amino functionality, Y will have the following formula:

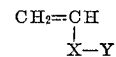

wherein U is alkylene of from 2 to 6 carbon atoms, more usually of from 2 to 3 carbon atoms and $T^3$ and $T^4$ are Illustrative amino functionalities are amino, methylamino, dimethylamino, dipropylamino, octylamino, etc. $T^1$ and $T^2$ may be the same or different.

The alkylene polyamines will have the following formula:

$$-(NH-U)_x-NT^3T^4$$

wherein U is alkylene of from 2 to 6 carbon atoms, more usually of from 2 to 3 carbon atoms and $T^3$ and $T^4$ are hydrogen or lower alkyl, while $x$ is an integer of from 1 to 5, more usually of from 1 to 4. Preferably, $x$ is 1 and $T^3$ and $T^4$ are hydrogen. Illustrative alkylene polyamines are ethylene diamine, propylene diamine, diethylene triamine, triethylene tetramine, tetraethylene pentamine, dipropylene triamine, N,N-dimethyl propylene diamine, etc.

When the amine group is imidazoline, it has the following formula:

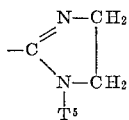

wherein $T^5$ is hydrogen or lower alkyl. Illustrative imidazoline groups are imidazoline, N-methylimidazoline, etc.

The terpolymers which find use in this invention can be prepared in a variety of ways. Descriptions of the methods can be found in copending application Ser. No. 477,935, filed Aug. 6, 1965, now abandoned.

One method is to directly incorporate an amine containing α-olefin with 2 hydrocarbon olefins into a polymer. This can be achieved by using an alkyl aluminum halide catalyst, e.g., alkyl aluminum sesquichloride, dialkyl aluminum chloride and trialkyl aluminum, wherein the alkyl groups are of from 1 to 3 carbon atoms, preferably ethyl, with vanadium oxychloride. (The trialkyl aluminum may be used with activated titanium trichloride.)

The ratio of atoms of aluminum to atoms of vanadium is not particularly critical, there being from 2 to 20 atoms of aluminum per atom of vanadium, usually from 2 to 10 atoms of aluminum per atom of vanadium. Critical to the process is the ratio of amine containing olefin to aluminum. There should be not more than 1 mole of amine or basic nitrogen containing olefin per atom of aluminum and preferably there should be not more than 1 equivalent of basic nitrogen per atom of aluminum in the catalyst. Usually, there will be from about 0.1 to 1 equivalent of basic nitrogen per atom of aluminum in the catalyst.

The temperature for the reaction will generally be in the range of about 10° to 100° C. Depending on the monomers—gases or liquids at room temperature—pressure may vary from atmospheric pressure to 100 p.s.i.

The solvents used will generally be inert hydrocarbons which are liquids at the temperature of reaction. Illustrative solvents are heptane, octane, benzene, toluene, xylene, etc. The concentrations used will generally be about 1 mM. of aluminum in from about 0.5 to 5 liters of solvent.

The hydrocarbon monomers will be α-olefins of from 2 to 6 carbon atoms. With gaseous α-olefins, the olefin is fed into the solvent at a convenient rate, while with liquid α-olefins, all of the olefin may be added initially or during the course of the polymerization, maintaining a proportionate concentration in solution of the aminoolefin.

Molecular weight of the polymer may be controlled by conventional means, e.g., hydrogen.

The product is worked up in the normal manner. The polymer is isolated and then extracted with methanol to remove catalyst residues and dried. Various modifications of this procedure are well known and appear in the literature.

By means of the above process, terpolymers are obtained which have excellent solubility in the hydrocarbon media in which, for the most part, they are employed.

Alternatively, a halo substituted olefin may be copolymerized with the desired hydrocarbon olefins and then the halogen displaced with a basic nitrogen compound. A method for preparing copolymers of hydrocarbon olefins and halohydrocarbon olefins is disclosed in copending application Ser. No. 304,958, filed on Aug. 27, 1963, and now abandoned. In that application, an organo-aluminum compound is used with either titanium trichloride or vanadium oxychloride and a Lewis base such as a tertiary amine or dialkyl ether.

The displacement reaction with the amine is generally carried out in an inert solvent. Suitable solvents include chlorobenzene, toluene, or higher boiling aromatic or chloroaromatic solvents, etc. Generally, the temperature will be in the range of about 100° to 200° C. With volatile amines or solvents, pressures above atmospheric will be used to maintain the reaction mixture in the liquid state. Otherwise, atmospheric pressures will suffice. The amount of amine used will be from about 1 to 10 moles per atom of bromine. The time for the reaction is dependent on the other variables, generally being in excess of 1 hour and usually not exceeding 24 hours.

The method of preparing the polymer is not critical to its use as a wax additive. Generally, the methods described in this application using "Ziegler-type" catalysts are preferred. These catalysts employ a Group III organometallic compound with either a titanium or vanadium halide or oxy compound.

The following examples are offered by way of illustration and not by way of limitation.

EXAMPLE I

Into a reaction flask was introduced 350 ml. of benzene, 2.7 cc. of ethyl aluminum sesquichloride (2 mM., 0.5 g.) as a 25 weight percent solution in n-heptane, 0.05 g. of pyridine, 0.32 g. of 8-bromo-1-octene and 0.1 g. of vanadium oxychloride and the flask flushed with nitrogen. Into the resulting solution at about 30° C. was then introduced ethylene at a flow rate of 1,600 ml. per min., propylene at a flow rate of 600 ml. per min. and hydrogen at a flow rate of 170 ml. per min. and the flow maintained for 30 mins.

At the end of this time, the catalyst was quenched with methanol and the polymer precipitated. The polymer was washed with methanol, dissolved in chlorobenzene and ten times the theoretical amount of ethylene diamine required to react with the bromine present was added. Also added was sodium hydroxide in an amount equal to 2 times the theoretical amount required for the neutralization of the hydrogen bromide. The mixture was heated at 100° to 130° C. overnight. The following morning the mixture was allowed to cool, the polymer precipitated with methanol, washed with methanol in a Waring Blender and then stripped dry in vacuo at 0.5 mm. Hg.

*Analysis.*—Ethylene, 75%; N, 0.16%; intrinsic viscosity [η], 1.6 (Tetralin at 135° C.).

EXAMPLE II

The procedure used in Example I was repeated, using the same amounts of materials except for the use of 0.47 g. of 8-bromo-1-octene. The product was worked up as previously described.

*Analysis.*—Ethylene, 73%; N, 0.16%; intrinsic viscosity [η], 1.48 (Tetralin at 135° C.).

In order to test the properties of the wax terpolymer composition, mixes were prepared comprising 75 weight percent of wax (AMP 154°–156° F.) and 25 weight percent of the terpolymer. Either hot melt mixing or a solution of the two components in an aromatic solvent, e.g., benzene and then removing the solvent by distillation in vacuo were employed to obtain the desired wax composition. Either of the methods is satisfactory and does not affect the final result. The samples for testing were prepared by spreading a bead of the wax terpolymer blend between aluminum foil strips (1" x 10") and then pressing the sandwich structure at 375° F. under pressure (10,000 lbs. gauge).

The peel strength (polymer adhesion of the aluminum strips) was determined on an Instron tester under the following conditions:

Chart speed, inches per minute—10; cross head speed, inches per minute—10; full scale load, grams—500; separation of jaws, inches—1. Duplicate determinations were made in all cases. The following table indicates the results obtained, reporting adhesion (grams per inch) as determined by measuring aluminum peel strength on the Instron tester.

TABLE I

| Polymer, example | Adhesion [1], g./in. |
|---|---|
| I | 400 |
| II | 300 |

[1] By Comparison a 75 wt. percent wax (AMP 154°-156° F.), 25 wt. percent ethylene-vinyl acetate copolymer (72% ethylene, mol. wt. 400,000 has an adhesion of 160 g./in.).

It is obvious from the above results that excellent adhesion to aluminum is achieved by combining the terpolymers having amine substituents with wax. Furthermore, the terpolymers are compatible with the wax forming homogeneous compositions with the wax, even at high concentrations of the polymer.

As will be evident to those skilled in the art, various modifications on this invention can be made or followed, in the light of the foregoing disclosure and discussion, without departing from the spirit or scope of the disclosure or from the scope of the following claims.

We claim:

1. A wax composition useful for adhering to an aluminum surface which comprises from about 60 to 90 weight percent of petroleum wax having an AMP melting point in the range of about 120 to 200 and respectively from about 10 to 40 weight percent of a terpolymer of the formula:

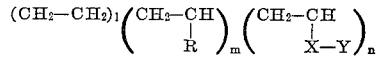

wherein R is lower alkyl of from 1 to 4 carbon atoms, X is an alkylene group of from 2 to 10 carbon atoms and Y is a basic nitrogen containing radical of from 0 to 16 carbon atoms having up to 6 basic nitrogen atoms selected from the group consisting of amino, alkylene polyamine and imidazoline of the formula:

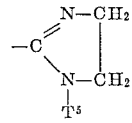

wherein $T^5$ is hydrgen or lower alkyl and $l$, $m$ and $n$ are the average number percent of the individual monomers adding up to 100 percent; $n$ is in the range of about 0.1 to 5 percent, $l$ is in the range of about 55 to 90 percent and $m$ is in the range of about 10 to 40 percent.

2. A composition according to claim 1, wherein Y is an alkylene polyamine of from 2 to 10 carbon atoms and from 1 to 5 amino groups, and $n$ is in the range of about 0.5 to 3 percent.

3. A composition according to claim 1, wherein Y is of the formula:

wherein $T^1$ and $T^2$ are hydrogen or alkyl of from 1 to 8 carbon atoms.

4. A composition according to claim 1, wherein Y is of the formula:

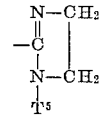

wherein $T^5$ is hydrogen or lower alkyl.

5. An article of manufacture having an aluminum base and a coating of a composition according to claim 1.

References Cited

UNITED STATES PATENTS 3,445,387  5/1969  Liston.

MORRIS LIEBMAN, Primary Examiner
P. R. MICHL, Assistant Examiner

U.S. Cl. X.R.
117—132, 135